United States Patent [19]

Lajack et al.

[11] 4,094,349
[45] June 13, 1978

[54] HAND SABRE SAW

[76] Inventors: William C. Lajack; Joseph J. Lajack, both of 3446 Berkshire, Warren, Mich. 48091

[21] Appl. No.: 773,927

[22] Filed: Mar. 3, 1977

[51] Int. Cl.² .......................................... B27B 21/00
[52] U.S. Cl. ............................... 145/31 B; 30/166 R
[58] Field of Search ..................... 145/31 R, 31 B; 30/166 R, 371

[56] References Cited

FOREIGN PATENT DOCUMENTS

| 1,052,085 | 9/1953 | France | 145/31 B |
| 983,198 | 2/1951 | France | 145/31 B |
| 982,398 | 1/1951 | France | 145/31 B |
| 952,930 | 5/1949 | France | 145/31 B |
| 313,825 | 6/1956 | Switzerland | 145/31 B |
| 512,611 | 9/1939 | United Kingdom | 145/31 B |

Primary Examiner—James L. Jones, Jr.
Assistant Examiner—J. T. Zatarga
Attorney, Agent, or Firm—Whittemore, Hulbert & Belknap

[57] ABSTRACT

A hand sabre saw for hacksaw blades or the like comprising an elongated body member having a slot in the top thereof for guiding a saw blade positioned therein in longitudinal reciprocal movement on the body member and for preventing lateral bending thereof, an annular collar extending around the saw blade and one end of the body member, a rivet securing the collar to the one end of the body member below the saw blade, said body member, collar and rivet forming a slot through which one end of the saw blade passes in reciprocal movement longitudinally of the body member, a handle positioned on the body member for reciprocal movement longitudinally thereof with the saw blade, a pin extending through the handle above the body member for securing the other end of the saw blade to the handle, rivets extending through the handle below and immediately adjacent the body member cooperable with the pin for guiding the handle in reciprocal movement longitudinally of the body member, and spring means secured to the other end of the body member and to the handle for aiding return of the hacksaw blade after a cutting stroke.

In one modification, a notch is provided in the one end of the body member to expose the cutting teeth of the saw blade to aid in accurately following a cut indicating mark after starting of a cut.

9 Claims, 6 Drawing Figures

U.S. Patent    June 13, 1978    4,094,349
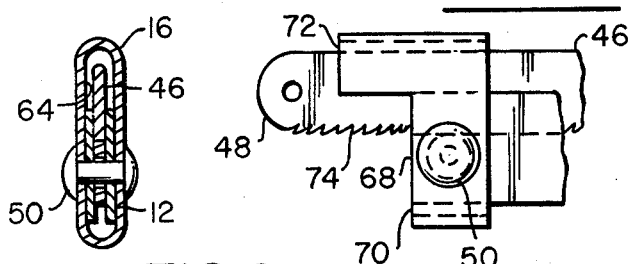
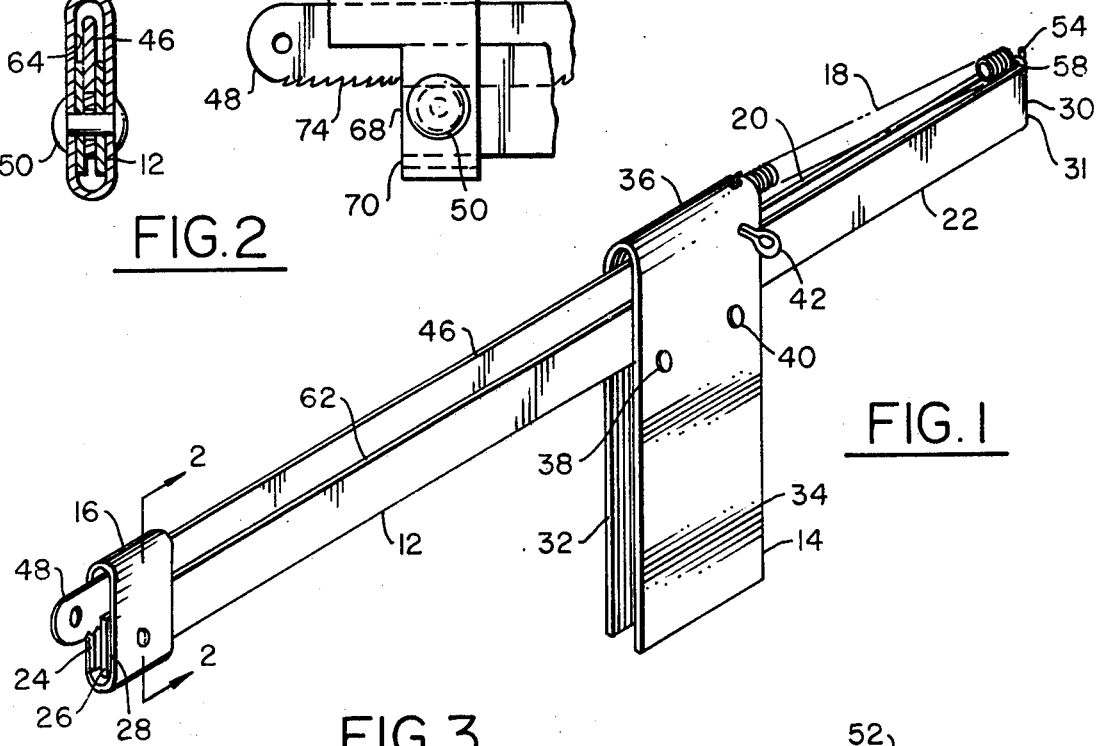
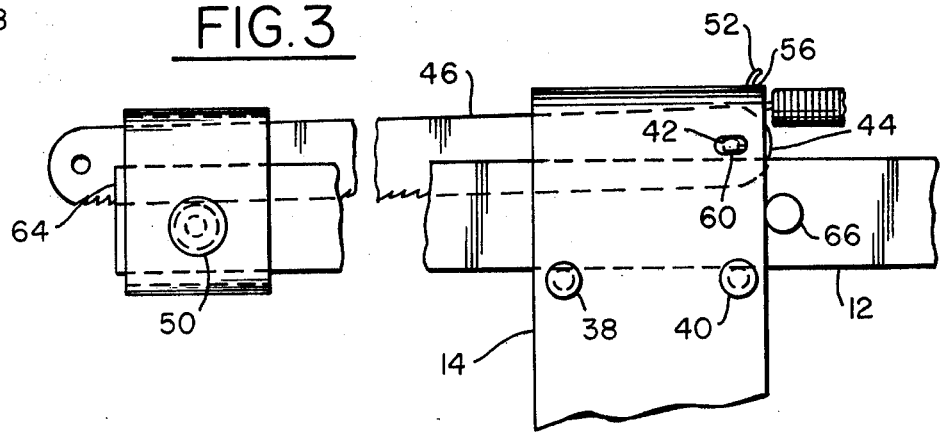
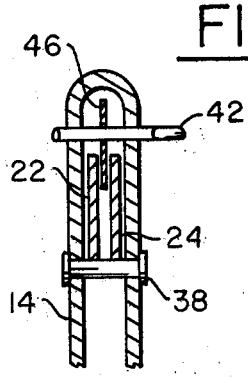
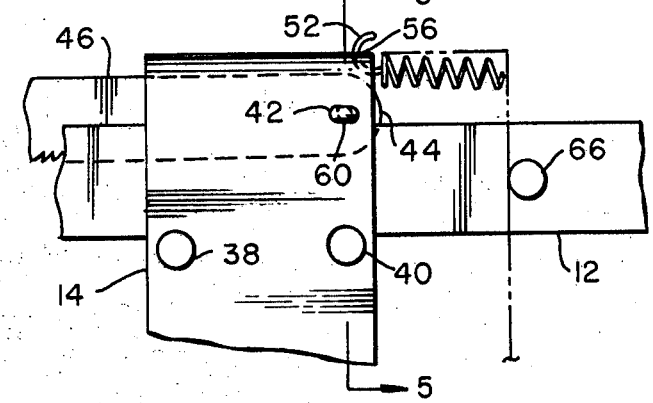

HAND SABRE SAW

BACKGROUND OF THE INVENTION

1. Field of the Invention

The invention relates to saw structures, and in particular refers to a hacksaw or sabre saw for manually cutting metal or the like, which is particularly advantageous in effecting deep cuts of more than three or four inches.

2. Description of the Prior Art

In the past, saw structures such as hacksaws and the like have been limited in use due to the generally C-shaped configuration of the blade-supporting structure which limits the depth of cut in the usual hacksaw to approximately three or four inches. Wherein handles for hacksaw blades or the like have in the past been provided, they provide no lateral support for the saw blade, so that the saw blades are often bent or broken during use. Consequently, the length of the cutting blade in such saw structures has been limited and the thickness thereof unnecessarily increased to reduce the possibility of bending or breaking in use.

SUMMARY OF THE INVENTION

The saw structure of the invention includes an elongated body member having a slot in the upper edge thereof for receiving a saw blade to guide the saw blade in longitudinal movement along the body member. A slot is also provided in one end of the saw structure through which one end of the saw blade extends in its reciprocal movement along the body member. A collar is riveted to one end of the body member, which collar surrounds the one end of the body member and one end of the saw blade to provide the slot in the one end of the saw structure. A handle extends over the body member for reciprocation longitudinally of the body member. Rivets extend through the handle below the body member which aid in guiding the handle in its reciprocal movement longitudinally of the body member. The other end of the saw blade is secured to the handle by means of a pin extending therethrough above the body member for reciprocal movement longitudinally of the body member therewith. The pin also aids in guiding the handle. Spring means are provided operable between the other end of the body member and the other end of the saw blade and handle to effect return of the handle toward the other end of the body member after a cutting stroke of the saw blade occurring on movement of the handle toward the one end of the body member.

In effecting a cut with the saw structure of the invention, the one end of the body member is positioned against the material being cut, whereby the saw blade is always guided laterally between the handle and the cut being made by the body member.

In one modification of the invention, a notch is provided in the one end of the body member, exposing the cutting teeth of the saw blade at the one end of the body member, whereby the saw blade may be accurately guided visually on a mark where a cut is desired by the saw blade after the cut is started.

BRIEF DESCRIPTION OF THE DRAWINGS

FIG. 1 is a perspective view of saw structure constructed in accordance with the invention.

FIG. 2 is an enlarged cross section of the saw structure illustrated in FIG. 1, taken substantially on the line 2—2 in FIG. 1.

FIG. 3 is an enlarged, broken, partial elevation view of the saw structure illustrated in FIG. 1, with the saw structure in an initial position prior to cutting therewith.

FIG. 4 is an enlarged, broken, partial elevation view of the saw structure illustrated in FIG. 1, similar to the elevation view of FIG. 3, but showing the saw structure in a position wherein the cutting stroke has been started, and showing the initial position of the handle portion of the saw structure in phantom.

FIG. 5 is a cross section view of a portion of the saw structure illustrated in FIG. 4, taken substantially on the line 5—5 in FIG. 4.

FIG. 6 is an enlarged elevation view of a modification of one end of the saw structure illustrated in FIG. 1.

DESCRIPTION OF THE PREFERRED EMBODIMENT

The saw structure 10 as shown best in FIG. 1 includes a body member 12, a handle 14, a collar 16, and resilient means 18.

More specifically, the body member 12 is constructed of a metal strap folded into a U shape as shown best in FIG. 1. The body member 12 as shown has elongated leg portions 20 and 22 extending the length thereof with free ends 24 and 26 at one end 28 of the body member 12. The relatively short connecting portion 30 of the U-shaped body member 12 is provided at the other end 31 of the body member. A stop pin or rivet 66 extends through the body member 12 immediately to the right of handle 14, as shown best in FIG. 3.

The handle 14 is again a U-shaped metal member having the leg portions 32 and 34 and the relatively short connecting portion 36. As shown best in FIGS. 1 and 5, the elongated leg portions 32 and 34 extend on each side of the body member 12. The handle 14 is guided in its movement along the body member 12 by rivets 38 and 40 extending through the leg portions 32 and 34 of the handle 14 immediately below the body member 12, as shown best in FIG. 5. A removable pin 42 extends transversely of the handle 14 through the leg portions 32 and 34 thereof immediately above the body member 12, as shown best in FIG. 5. The pin 42 secures the end 44 of a saw blade 46 to the handle 14 and aids in guiding the handle on the body member, as will be considered subsequently.

The collar 16, as shown best in FIG. 1, extends around the end 28 of the body member 12 and around the end 48 of the saw blade 46. The annular collar 16 is secured to the end 28 of the body member 12 by rivet 50. The collar 16 retains the end 48 of the saw blade 46 in an approximate relation to the body member 12 during cutting, as will be considered subsequently. The collar 16 is again a metal member and may be a section of a deformed metal tube.

The resilient means 18 may be a steel spring having hook portions 52 and 54 at the opposite ends thereof. The hook portion 52 extends through an opening 56 in the handle 14 to secure one end of the spring 18 to the handle 14. The hook portion 54 extends through an opening 58 in the connecting portion 30 of the body member 12 to connect the other end of the spring 18 to the body member 12.

In use, a standard saw blade 46 having openings 60 adjacent the ends 44 and 48 thereof is positioned in the slot 62 formed between the legs 20 and 22 of the body member 12. The end 44 of the saw blade 46 is connected to the handle 14 of the saw structure 10 by inserting the pin 42 in the opening 60 at the end 44. The end 48 of the saw blade 46 extends through the slot 64 provided in the end 28 of the body member 12 between the free ends 24 and 26 of the body member 12, the collar 16 and the rivet 50.

With the saw blade 46 so installed, the end 28 of the body member 12 is positioned against an article to be cut and the handle 14 is reciprocated longitudinally of the body member 12 to move the saw blade 46 in and out of the slot 64 in cutting and withdrawing strokes. During such operation, the saw blade is maintained in the slot 62 in general alignment with the body member 12 by the collar 16. At all times during both the cutting and withdrawing stroke, but especially during the cutting stroke, the saw blade 46 is supported laterally by the leg portions of the body member 12 between the collar 16 and the handle 14. The handle 14 is guided on the body member 12 by the rivets 38 and 40 and the pin 42. The return stroke is aided by the spring 18, the strength of which is chosen to return the handle 14 to a position against the rivet 66 extending through the legs of the leg portion of the body member 12, as shown best in FIG. 3, when the saw structure 10 is not in use and so as not to offer objectionable resistance to a cutting stroke with the saw structure 10.

In the modified saw structure illustrated in FIG. 6, a notch 68 is cut from the collar 16 and the end 28 of the body member 12, and the rivet 50 is centered on the remaining portion of the collar 16. With such modified structure, the cut is started with the part to be cut positioned on the surface 70 of the notch 68. After the cut is started, the part to be cut is positioned on the surface 72 of the collar 16. Such modified structure allows the viewing of a guide line on the part to be cut after the cut has been started, since the cutting teeth 74 of the saw blade 46 may be viewed through the notch 68 during deep cuts.

The entire saw structure may be made of metal such as aluminum or steel. However, other materials may be used as desired and as required function dictates.

While one embodiment of the present invention and one modification thereof have been disclosed in detail, it will be understood that other embodiments and modifications of the disclosed structure are contemplated by the inventor. It is intended to include all such embodiments and modifications as are defined by the appended claims within the scope of the invention.

What I claim as my invention is:

1. A saw including an elongated, U-shaped body member constructed of an elongated metal band folded centrally to provide a short connecting portion and two elongated leg portions defining a slot capable of receiving a saw blade therebetween, which leg portions extend longitudinally of the body member with the connecting portion at one end of the body member, a handle constructed of an elongated U-shaped metal band folded centrally to provide a connecting portion and two elongated leg portions positioned over the body member with the leg portions of the handle immediately adjacent and outside of the leg portions of the body member and with the connecting portion above the body member, a collar constructed of a continuous metal band secured to the other end of the body member extending above the body member for guiding a saw blade therethrough, means for securing the collar to the other end of the body member and for supporting a saw blade guided through the collar, means for securing one end of a saw blade to the handle above the body member with the saw blade extending into the slot defined between the leg portions of the body member, and means for guiding the handle in movement longitudinally of the body member.

2. Structure as set forth in claim 1, wherein the means for securing the collar to the other end of the body member and for supporting a saw blade guided through the collar includes a rivet extending through the collar and the body member and across the slot provided in the body member.

3. Structure as set forth in claim 1, wherein the means for securing one end of a saw blade to the handle comprises a cotter pin extending through the handle adapted to extend through an opening in one end of the saw blade immediately above the top of the body member.

4. Structure as set forth in claim 1, wherein the means for guiding the handle in movement longitudinally of the body member includes two spaced apart rivets extending through the handle immediately beneath the body member and a cotter pin extending through the handle immediately above the body member.

5. Structure as set forth in claim 1, and further including a spring, one end of which is secured to the connecting portion of the body member and the other end of which is secured to the connecting portion of the handle for urging the handle toward the one end of the body member.

6. Structure as set forth in claim 5, and further including a stop on the body member operable between the body member and handle for limiting the movement of the handle toward the one end of the body member.

7. Structure as set forth in claim 1, wherein the front lower portion of the collar is cut away to expose a saw blade extending therethrough and beyond the other end of the body member whereby the saw blade teeth may be directed onto a workpiece by sight.

8. A saw including a body member constructed of an elongated metal band bent in the middle to form a U-shaped body member having two elongated leg portions connected together by a connecting portion at one end of the body member to provide a slot therebetween in which a saw blade may be guided for movement longitudinally of the body member, a handle constructed of an elongated metal band folded in the center to provide a pair of elongated leg portions on either side of the elongated leg portions of the body member connected at the top by a connecting portion, a continuous metal band collar surrounding the other end of the body member, a rivet securing the collar to the other end of the body member extending through the collar and the leg portions of the body member and across the slot between the leg portions of the body member to support a saw blade extending through the collar partly above the top of the body member, a spring one end of which is secured to the one end of the body member and the other end of which is secured to the connecting portion of the handle, a cotter pin extending through the handle immediately above the body member for securing one end of a saw blade positioned partly within the slot formed between the leg portions of the body member to the handle and for aiding in the guiding of the handle in movement longitudinally of the body member, a pair of spaced apart rivets extending through the handle immediately below the body member for guiding the handle in movement longitudinally of the body member, and a stop secured to the body member between the handle and the one end thereof for limiting movement of the handle toward the one end of the body member under bias of the spring.

9. Structure as set forth in claim 8, wherein the collar extends longitudinally of the body member outwardly of the other end of the body member and wherein the lower edge of the collar outwardly of the other end of the body member is cut away to expose a saw blade extending through the collar longitudinally of the body member whereby the saw blade may be positioned on material to be cut by sight.

* * * * *